United States Patent [19]

Quaeck et al.

[11] 4,417,634
[45] Nov. 29, 1983

[54] ELEVATING TRANSPORTER WITH MECHANICAL DRIVE

[75] Inventors: Manfred W. Quaeck, Redmond; Douglas Ross, Woodinville, both of Wash.

[73] Assignee: CTEC Company, Bellevue, Wash.

[21] Appl. No.: 232,561

[22] Filed: Feb. 9, 1981

[51] Int. Cl.³ ............................................. B62D 63/00
[52] U.S. Cl. ..................................... 180/22; 280/81.5
[58] Field of Search ............................... 180/22, 24.12; 280/81.5, 99, 683, 684, 704, 713, 771, 685, 687, 695, 696, 700, 701, 43, 47, 43.13, 43.17, 83, 81 R, 81 A, 86, 97, 98, 670

[56] References Cited

U.S. PATENT DOCUMENTS

| | | | |
|---|---|---|---|
| 2,150,322 | 3/1939 | Garnett et al. | 280/670 |
| 2,220,916 | 11/1940 | Schiff | 280/695 |
| 3,003,781 | 10/1961 | Black | 280/683 |
| 3,091,476 | 5/1963 | Blake | 280/43.13 |
| 3,295,623 | 1/1967 | Kyzer | 280/81.5 |

FOREIGN PATENT DOCUMENTS

| | | | |
|---|---|---|---|
| 1430603 | 3/1969 | Fed. Rep. of Germany | 280/43 |
| 2300878 | 7/1973 | Fed. Rep. of Germany | 280/99 |
| 2332243 | 7/1974 | Fed. Rep. of Germany | 280/81 R |
| 1521618 | 3/1968 | France | 280/81 A |
| 848205 | 9/1960 | United Kingdom | 280/700 |

*Primary Examiner*—Joseph F. Peters, Jr.
*Assistant Examiner*—Ross Weaver
*Attorney, Agent, or Firm*—Seed, Berry, Vernon & Baynham

[57] ABSTRACT

An elevating transport vehicle has its frame carried by steerable idler bogies and by drive wheels on an axle assembly having a mechanical drive via a telescopic drive shaft from an engine and transmission mounted on the frame. The drive axle assembly is supported beneath the frame by a pivotally mounted tie rod and swing arm at each side of the vehicle. Hydraulic cylinders act between the frame and the bogies and swing arms to raise and lower the vehicle frame and with a telescopic drive shaft from the first to the second drive axle assembly.

5 Claims, 11 Drawing Figures

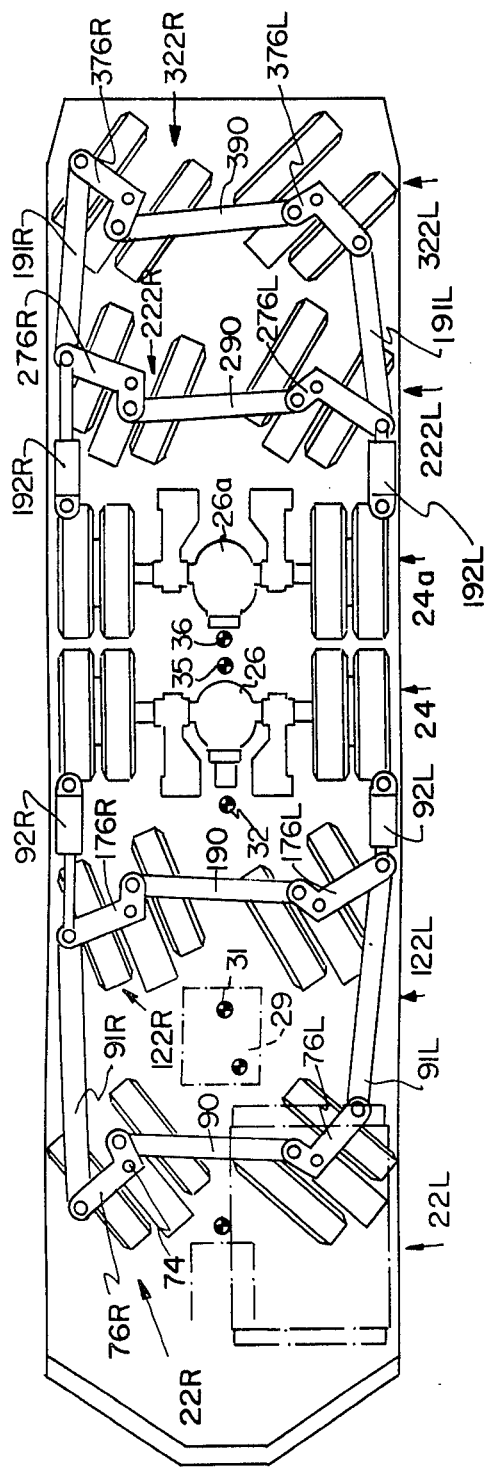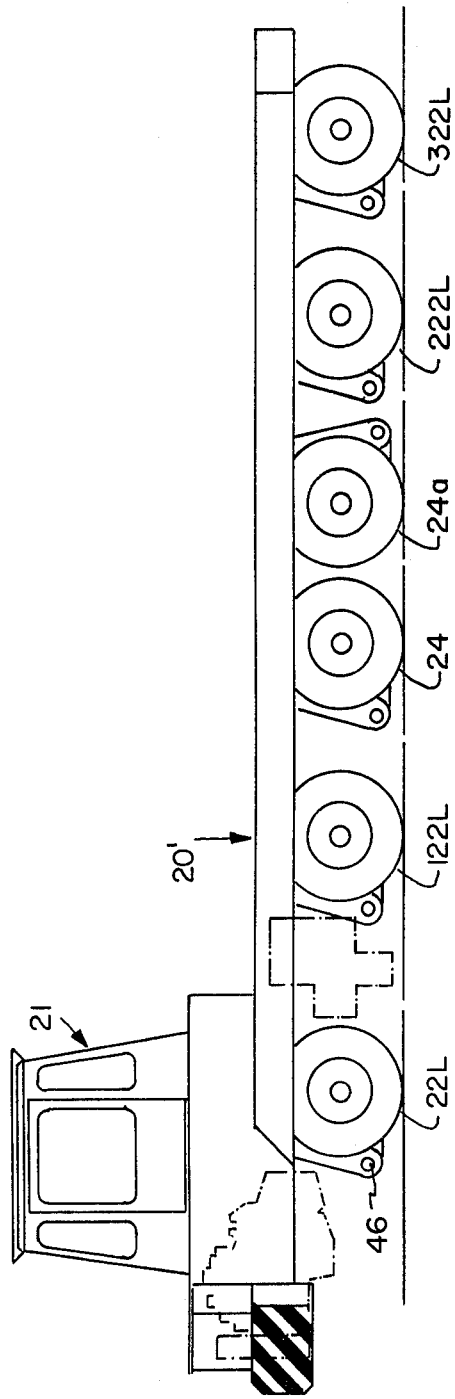
FIG. 4
FIG. 3

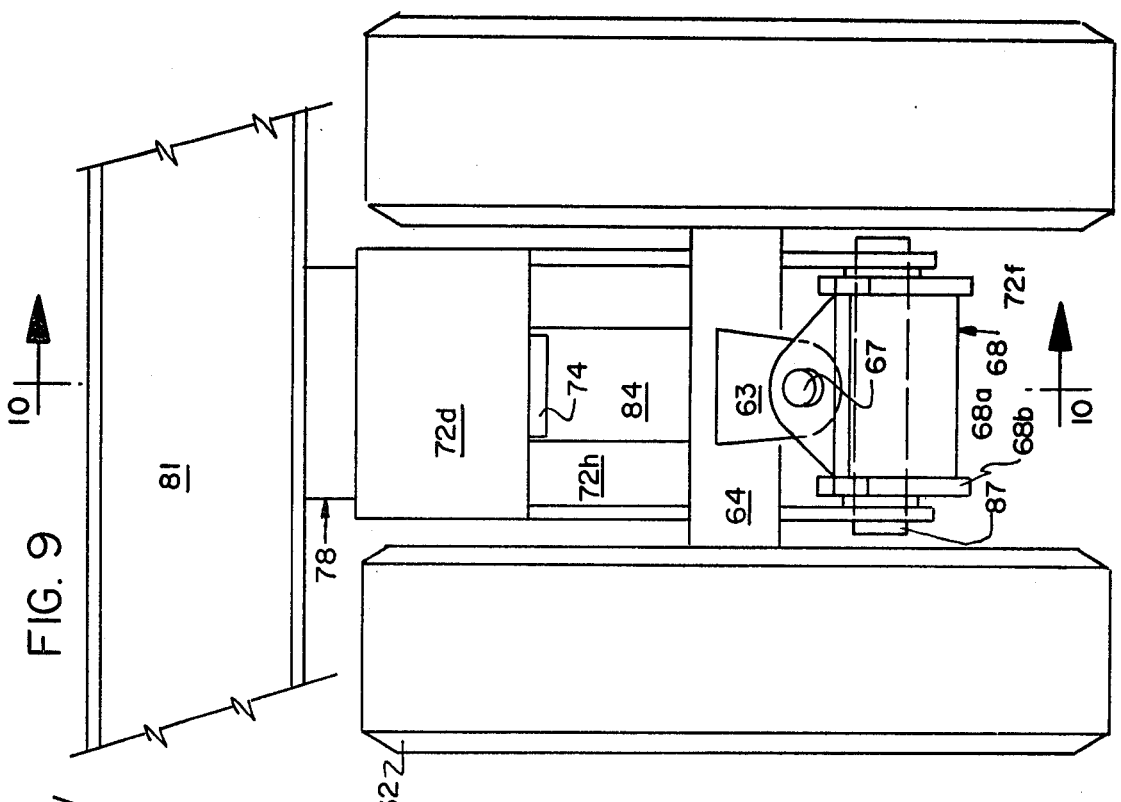

ELEVATING TRANSPORTER WITH MECHANICAL DRIVE

TECHNICAL FIELD

The present invention relates to elevating transport vehicles of the type in which the entire vehicle body, including the cab, can be raised or lowered, and more particularly, to such a vehicle in which a mechanical drive system is used to power the driven wheels.

BACKGROUND ART

In recent years, it has been the favored practice in steel mills to load steel coils, slabs, ingots, etc., on large, heavy-duty pallet stands and then lift and transport the loaded stands, often weighing 50 to 250 tons, by the use of special trucks with elevating platforms. Heretofore, it was common to load the steel articles by crane directly onto special expensive, heavy-duty trailers, but these were too frequently damaged during the loading operation and were costly to repair. The elevating transporters used with the pallet stands have been the type in which the entire vehicle body (frame, platform and cab) were elevated by hydraulic cylinders seated on multiple sets of steerable wheels which were driven by hydrostatic motors. Such a transporter is backed, with its platform in lowered position, beneath a loaded pallet stand, and then the platform is raised to lift the legs of the stand off the ground so that the loaded pallet stand can be carried by the transporter to the desired work or storage site where it is unloaded by lowering the platform and driving the transporter from beneath the stand. In this manner, a single transporter can be used to move multiple pallet stands. When very heavy loads are encountered, such as in steel mills and shipyards, an elevating transporter needs several wheel sets along its length to adequately spread the load. It has been the practice to use hydraulic motors to power the driven wheel. However, for safety reasons, in steel mills it is preferred because of the fire environment to minimize the use of equipment subject to possible oil spillage. Accordingly, vehicles with mechanical drives are preferred over vehicles driven by hydraulic motors since the oil pumped to the latter in substantial volume is under high pressure and is therefore likely to spray over a relatively wide area if one of the transfer hoses is ruptured or a hole fitting breaks. Mechanically driven vehicles are also commonly preferred over hydraulically driven vehicles because they are usually easier to trouble-shoot; i.e., a specialist is not needed on the maintenance staff for most trouble-shooting of mechanically driven vehicles, whereas a hydraulic specialist may be required for trouble-shooting of hydraulically driven vehicles, particularly when multiple sets of wheels are driven and steered hydraulically.

DISCLOSURE OF THE INVENTION

The elevating transport vehicle according to the present invention contains at least a pair of steerable idler bogies and a pair of non-steerable drive wheels on a drive axle assembly. Respective hydraulic cylinders act between the vehicle frame and the bogies and drive axle assembly for raising and lowering the frame. An engine and transmission move up and down with the frame, and a telescopic drive shaft with universal end connections transfers the power from the transmission to a differential on the drive axle.

For heavy loads, a tandem drive axle arrangement is preferred, in which case a telescopic drive shaft with universal end connections transfers power between the differentials of the tandem drive axles.

The elevating hydraulic cylinders on the drive axle assemblies are mounted on a bottom swing arm pivotally connected beneath the axle and at the bottom of a leg depending from the vehicle frame. An upper tie rod extends oppositely of the swing arm from a pivotal connection above the axle to a pivotal frame connection. The pivotal connecting points for the swing arm and tie rod are selected so that there is a minimum of fore-and-aft movement of the axle relative to the vehicle frame as the elevating cylinders are extended and retracted to raise and lower the frame. In the case of tandem drive axles, the axle assemblies have their respective swing arms extending in opposite directions and their respective tie rods extending toward one another. The telescopic drive shaft between the differentials of the tandem axles allows for the fore-and-aft movement of the axles relative to one another occurring when the lifting cylinders are operated.

Each bogie preferably has a pair of wheels on an axle which is free to oscillate to conform with the ground surface and is mounted on a swing arm carried at the lower end of a swivel leg. A hydraulic cylinder unit extends between the swing arm and the swivel leg for raising and lowering the vehicle frame in concert with the hydraulic cylinders on the drive axles.

BRIEF DESCRIPTION OF THE DRAWINGS

In the drawings:

FIG. 3 is a side elevational view showing a preferred layout of the wheels for a transporter designed to handle heavy loads;

FIG. 4 is a plan view showing the layout of the steering for the transporter of FIG. 3;

FIG. 9 is a rear elevational view of one of the steerable bogies;

FIG. 10 is a vertical sectional view taken as indicated by line 10—10 of FIG. 9.

BEST MODE FOR CARRYING OUT THE INVENTION

Figure 1:
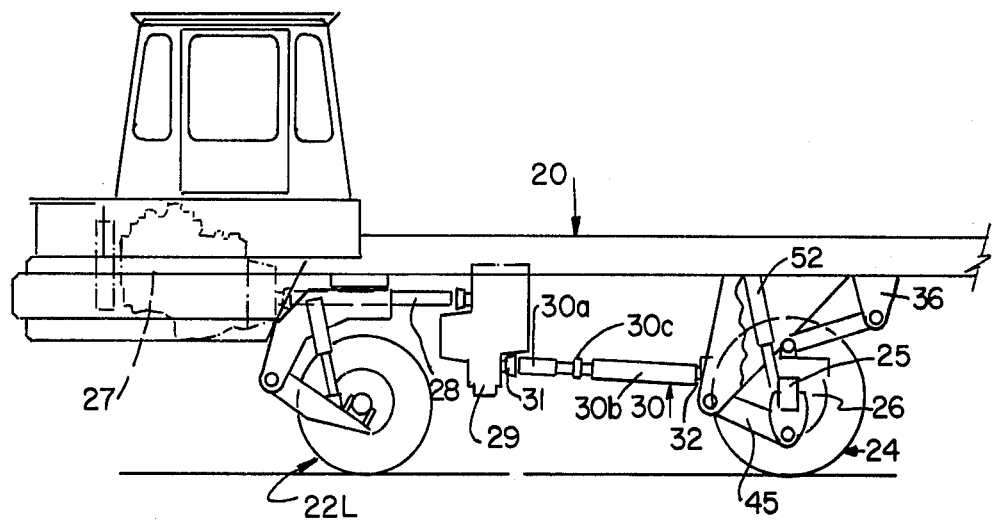
FIGS. 1 and 2 are side elevational views of a vehicle embodying the present invention shown in raised and lowered position, respectively.

In its simplest form, the invention has as its embodiment a truck frame 20 with an operator's cab 21 thereon which are elevated by operation of hydraulic lift cylinder units on a pair of front steerable bogies 22 and on a drive wheel assembly 24 therebehind having an axle 25 with a central differential 26. Power to the differential 26 is transmitted from an engine 27 via a front drive shaft 28 to a transmission 29 and from the latter by a shaft unit 30 having universal connections 31,32 at its ends. Since the engine 27 and transmission 29 are fixed relative to the frame 20, and hence move up and down with the frame relative to the differential 26, the shaft unit 30 not only must be free to pivot at its ends as provided by the universals 31, 32 but must also be extensible. This is accomplished by providing the drive unit 30 with a central slidable spline interfit 30c between front and back shaft sections 30a,30b.

Figure 2:
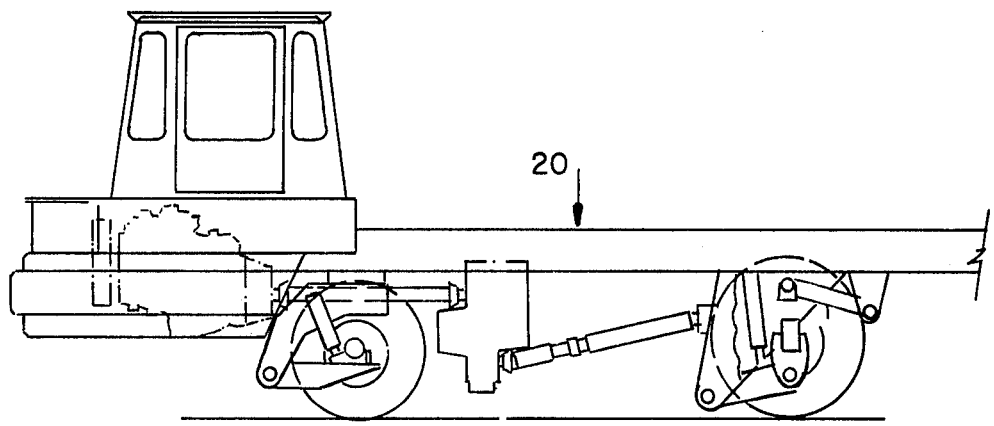

For heavier loads, the truck may have tandem drive axle assemblies and/or additional steerable bogies also equipped with hydraulic lift cylinder units. An example is illustrated in FIGS. 2-3 wherein the truck has two sets of front bogies 22,22a and two sets of rear bogies 22b,22c, all identical, and a central set of tandem drive axle assemblies 24,24a, which will be referred to herein as the front and back drive axle assemblies. In this instance, the power to the rear drive axle assembly 24a is transmitted from the differential 26 of the front one 24 to the differential 26a of the rear one 24a by an intermediate drive shaft unit 34. Like the unit 30, this unit 34 has front and back universal connections 35,35a and a center spline connection 34c between front and rear parts 34a,34b to provide for relative motion between the drive axle assemblies 24,24a. The corresponding parts of these assemblies are right and lefthand complements of one another, and will be distinguished in the drawing by providing the identifying numeral for the parts of the back drive axle assembly 24a with the letter "a" as a suffix to the numeral for the corresponding part of the front drive axle assembly 24.

The truck frame 20 has a pair of longitudinal side rails 20a which are suitably cross-braced. Included in the bracing are a pair of central transverse frame members 20b between which extend longitudinal anchor members 20c, 20d and 20e at each side. Depending rigidly from the central anchor member 20d are a pair of outer and inner clevis brackets 36,37, and these are complemented by pairs of clevises 38,38a mounted on the housings of the drive axle assemblies 24,24a. Extending between these clevis brackets and respective clevises are front and back tie rods 40,40a having pivot pin connections 39 and 41 therewith.

The underside of the housings of the drive axle assemblies have clevises 42,42a with pivot pins 43 and bearings 44 to receive the hub at the respective end of swing arms 45,45a of a box section. These arms extend forwardly and rearwardly to make pivot pin connections 46 at end hubs on the swing arms with the feet of legs having cheek plates 47,48 and 47a,48a which connect at the top to the frame members 20c and 20e. These cheek plates taper downwardly and are respectively interconnected front and back by webs 50, 50a. Between the pairs of cheek plates are mounted lift cylinder assemblies 52,52a which are pivotally connected at the top of the vehicle frame and at the bottom to the swing arms 45,45a. These pivotal connections are made by stop pins 53,53a extending through a clevis 54,54a on the underside of the frame members 20c and 20e, and through eyes 55, 55a on the cylinders, and by bottom pins 56,56a. These bottom pins extend through eyes 57,57a on the ends of the piston rods of cylinder units 52,52a and through matching clevises 58,58a fixed on the top side of the swing arms 45,45a.

Each bogie 22 has a pair of wheels 62 mounted on the ends of an axle 64 from which a pair of clevis arms 63 slope downwardly between two forks 65,66 to receive a swivel pin 67. The forks 65,66 are mounted on a sloped web plate 68a at the free end of a swing arm 68 made up of a pair of side plates 68b which are connected by a bottom web 68c, the web plate 68a, and a hub 68d. This hub is swing-mounted for vertical movement on a pin 70 journaled at the lower end of a swivel leg assembly 72 having an upper vertical swivel pin 74 connected to a steering arm 76. The swivel pin 74 is journaled in a pair of bearings 75,77 mounted in a bearing box assembly 78 held between a pair of transverse frame members 80,81. A thrust bearing 82 is seated between the bearing box assembly 78 and a horizontal plate component 72a of the swivel leg 72. It is this plate 72a to which the swivel pin 74 is fixed. An opening 83 is provided in the plate 72a for passage of the cylinder of a lift cylinder unit 84 having a top eye 84a receiving a pivot pin 85 in turn mounted at its ends to a pair of side plates 72b. These side plates are connected to the longitudinal side edges of the horizontal plate 72a and are also interconnected by a sloped front plate 72c, a vertical rear plate 72d, and top cross-brace 72e. The downward reach from the horizontal plate 72a to the pivot pin 70 is made by a pair of side plates 72f interconnected by front and rear plates 72g,72h and a bottom plate 72i, making a box section. The side plates 72f project below the bottom plate 72i as forks to receive the pin 70.

At its lower free end, the piston rod of the cylinder assembly 84 has an eye 86 which is pivoted on a pin 87, in turn mounted at its ends between a pair of blocks 88 mounted on the opposed inner faces of the side plates 68b of the swing arm 68. It will be noted that the pins 70, 85 and 87 are parallel and normally horizontal, and that the pin 67 for oscillation of the axle 64 normally occupies a vertical plane. On level ground, the axle 64 is horizontal and parallel to the swing axis of the arm 68. Preferably, the longitudinal axis of the axle 64 is centered beneath the vertical turning axis of the swivel pin 74 when the vehicle frame 20 is at its normal traveling height above the ground; i.e., when the cylinder unit 84 is partly extended.

Referring to FIG. 4, the steering arrangement is shown for the vehicle having two pairs of front bogies 22 and 122 and two pairs of rear bogies 222 and 322. Each bogie has a bell crank mounted on its swivel pin 74, the bell cranks being numbered 76, 176, 276 and 376 for the bogies 22, 122, 222 and 322, respectively. Suffixes "R" and "L" have been added to designate right and left; i.e., 76R refers to the bell crank on the right extreme front bogie 22R, for example. The bell cranks in the right side of the vehicle are pivotally cross-connected with respective of the bell cranks on the left side by cross-links 90, 190, 290 and 390 so that the bogies of each right and left pair must turn in unison. Longitudinal links 91R and 191R on the right pivotally interconnect bell cranks 76R and 176R, and 276R and 376, respectively, and longitudinal links 91L and 191L on the left pivotally interconnect the corresponding lefthand bell cranks. Double-acting hydraulic steering cylinders 92R,92L, acting on bell cranks 176R and 176L, respectively, operate the front steering linkage for the two pairs of front bogies, and double-acting hydraulic steering cylinders 192R,192L, acting on the bell cranks 276R and 276L, respectively, operate the front steering linkage for two pairs of rear bogies.

When the vehicle is in a left turn, as illustrated in FIG. 4, the longer arms of the bell cranks are lined up with radii from the center of the turning circle through the vertical swivel axis of the respective bogies. The pivotal connections at the ends of the longitudinal links 91R,91L and 191R,191L to the respective bell cranks are so located that all of the bogies can simultaneously line up for straight ahead travel and yet will have their axles substantially on respective radii from the center of the various turning circles.

Figure 11:
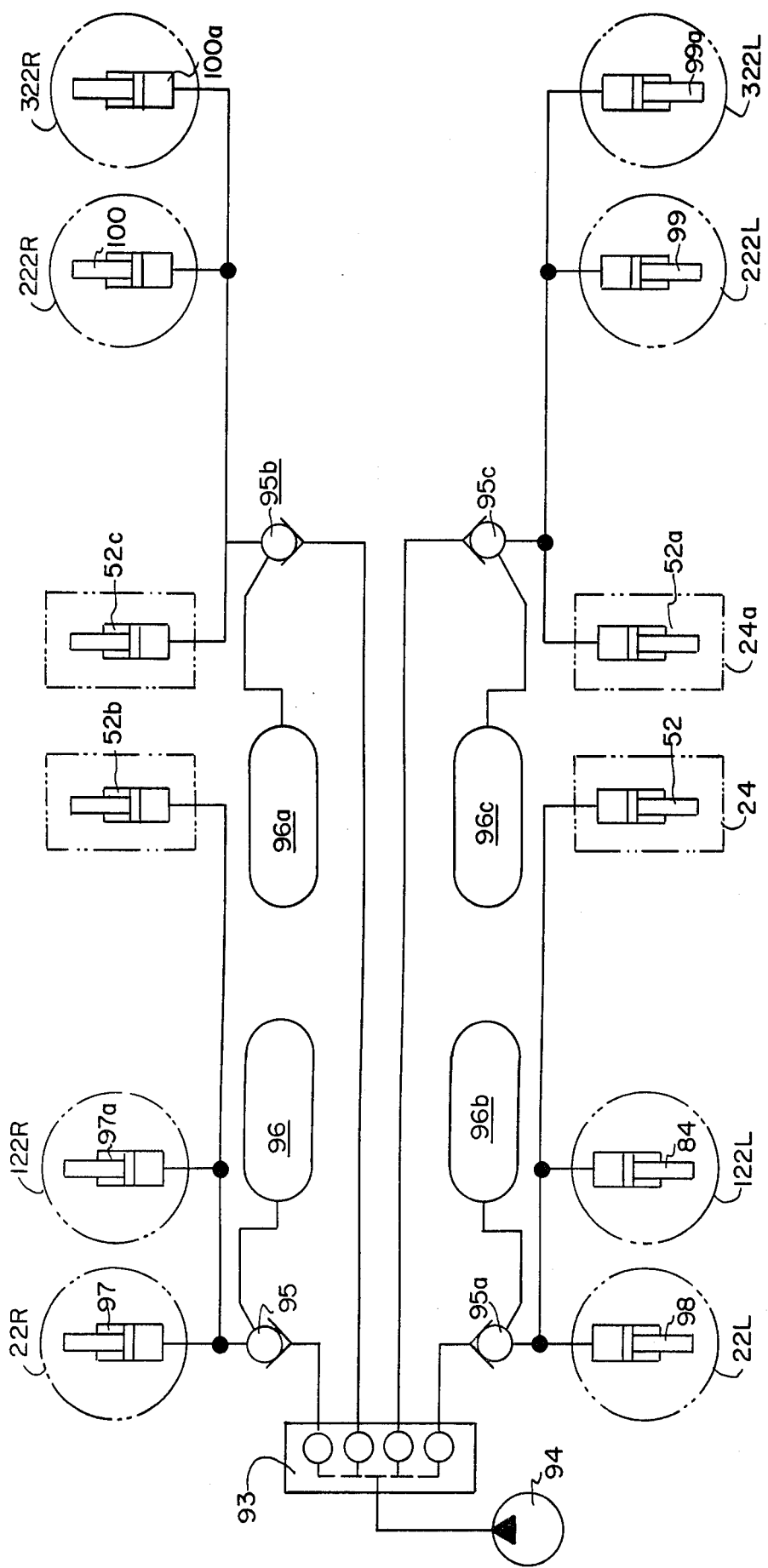
FIG. 11 is a schematic of a hydraulic system for the elevating cylinders in the embodiment shown in FIG. 3.

Referring to FIG. 11, a representative hydraulic circuit is shown for controlling the various lifting cylinder units on the steering bogies and drive axle assemblies of the embodiment in FIG. 3. In FIG. 11, the wheels of the steered bogies have been indicated as circles in phantom, and the drive axle assemblies 24,24a have been indicated as rectangles in phantom. It will be noted that a flow divider 93 fed from a pump 94 feeds pressurized oil to four hydraulic circuits, two on each side, having respective pilot-operated check valves 95, 95a, 95b and 95c, and air/oil accumulators 96, 96a, 96b and 96c. In FIG. 11, the lift cylinders 97, 97a, 98, 99, 99a, 100 and 100a are all arranged like the cylinder 84 in FIGS. 9–10. With the indicated circuit, each quadrant of lifting cylinders, as, for example, the right front quadrant, comprising cylinders 97, 97a and 52b, can operate independently of the others so that the vehicle can better adapt to uneven ground. Each lifting cylinder also has an air spring affect by way of the air/oil accumulator 96 for the respective quadrant.

Figure 5:
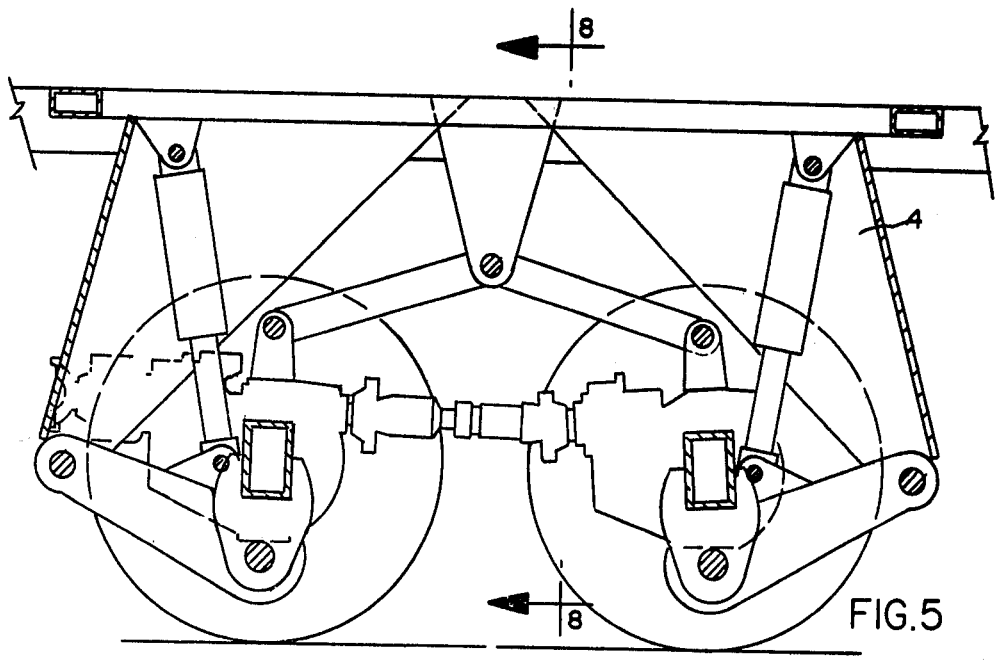
FIGS. 5, 6 and 7 are elevational sectional views showing the vehicle frame in raised, drive (intermediate), and lowered positions, respectively, in the region of the center driven wheels of the embodiment shown in FIG. 3.
Figure 6:
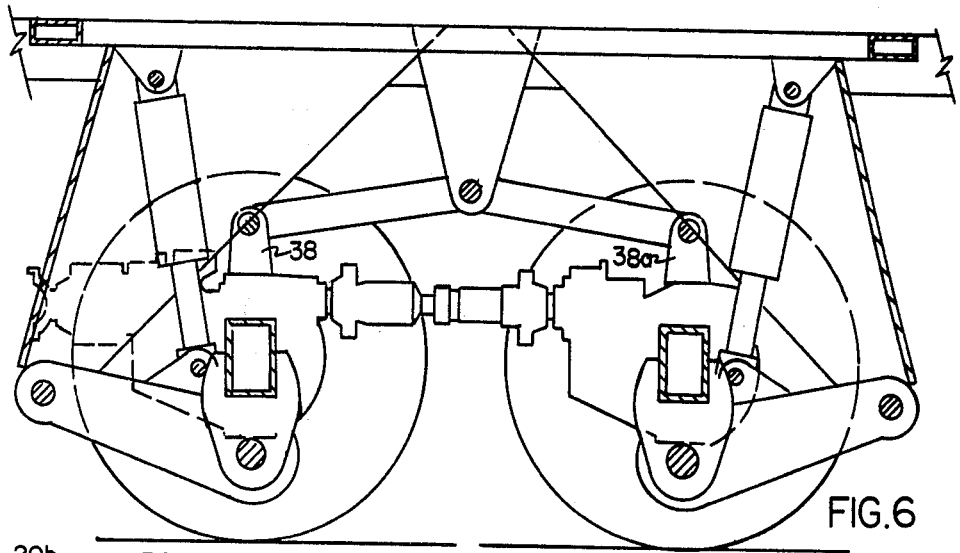
Figure 7:
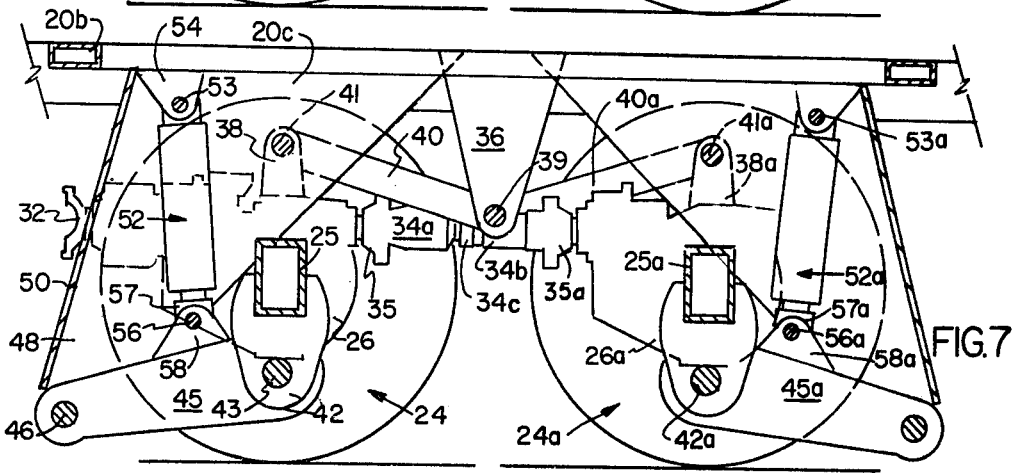
Figure 8:
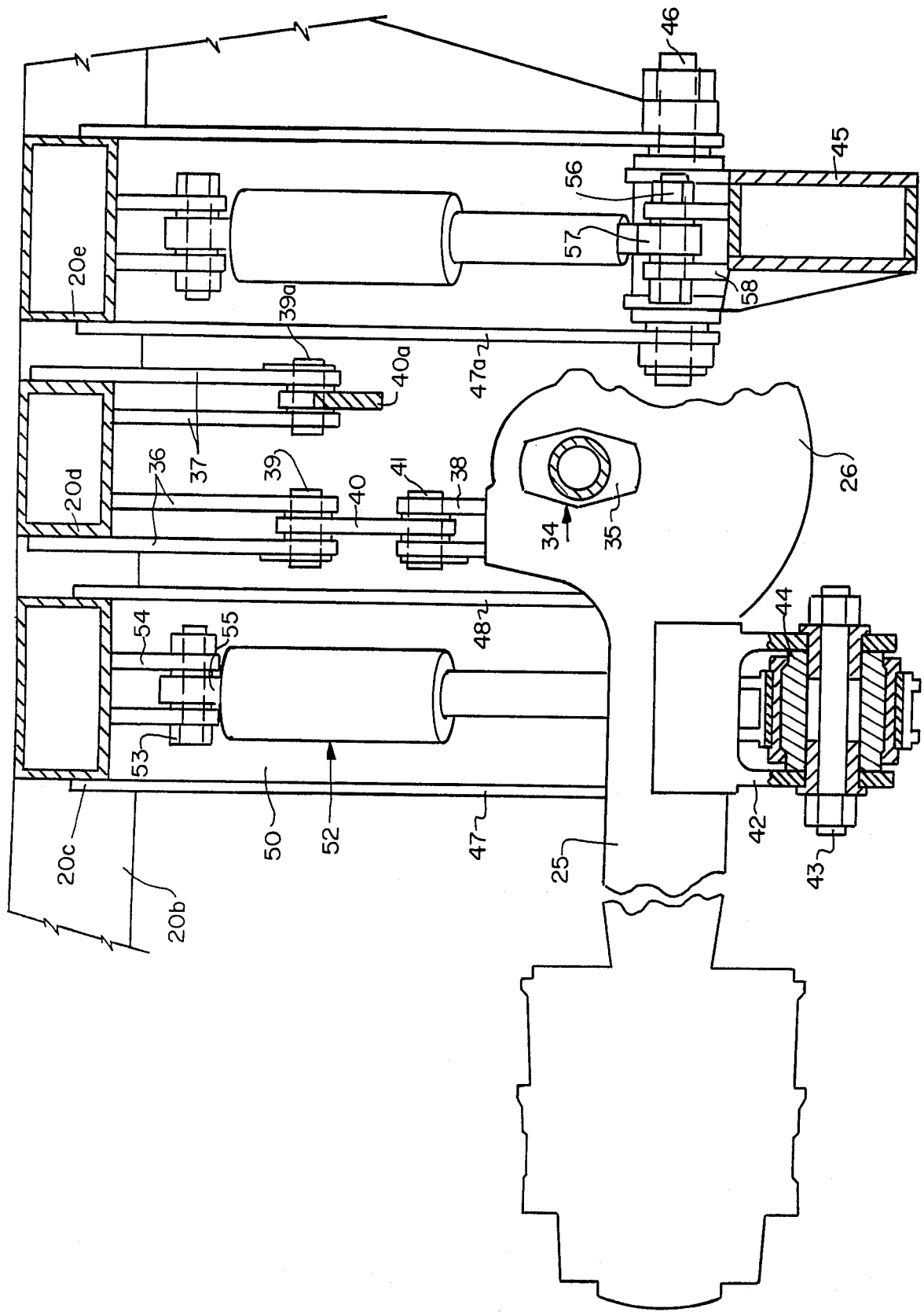
FIG. 8 is a transverse sectional view taken as indicated by line 8—8 of FIG. 5.

With reference to FIGS. 5–7, it is important to note that as the vehicle frame is lowered from elevated position (FIG. 5) to lowered position (FIG. 7), the tie rods 40,40a each swing from a downwardly sloped position (FIG. 5) to an upwardly sloped position (FIG. 7) while the swing arms 45,45a swing from a downwardly sloped position (FIG. 5) to an upwardly sloped position (FIG. 7). The geometry is such that the axles 25,25a only rotate a few degrees and move closer together only a short distance as the vehicle frame lowers. This change in angularity and distance is taken up by the universals 35,35a and spline connection 34c.

Normally, the vehicle is operated as in FIG. 6, with its lifting cylinder units not fully extended or retracted when the vehicle is moving between loading and unloading sites. This leaves piston travel available for uneven road surfaces or unequal loading on the vehicle frame.

Hand-operated controls for the control circuits to the lifting cylinders of the bogies and drive axles and to the steering cylinders are provided in the operator's cab 21. The steering control circuit feeds the steering cylinders 92R,192R while discharging from the steering cylinders 92L,192L for a left turn (FIG. 4), and does the reverse action for a right turn.

It is important to note by reference to FIGS. 5–7 that when tandem axles are used, the rotation of the tandem axles caused by the raising and lowering of the vehicle frame is very little. As a result, the relatively short splined shaft 34 between the two differentials 26,26a need have only a small pivotal action at universals 35,35a.

The number of bogies utilized depends upon the loads to be moved. When multiple sets are used, it is preferred to place them fore and aft of the drive wheels, as illustrated, for example, in FIGS. 3–4, but it is not essential that the same number of bogies be fore and aft.

Those skilled in the art could make many modifications to the preferred embodiment described and shown without departing from the general concept of this invention. Therefore, this invention should not be limited unless it is necessary to do so because of the teachings of the prior art or the fair reading of the appended claims.

We claim:

1. An elevating transport vehicle for raising and lowering heavy loads and transporting them, said vehicle comprising:
    an elongated transport frame assembly,
    a first axle assembly with a first differential and a set of wheels,
    a second axle assembly in tandem with the first axle assembly and having a set of wheels and a second differential aligned with the first differential,
    a central telescopic drive shaft extending between said differential and having universal joint connections therewith,
    power means carried by the vehicle frame and operatively connected with one of said differentials,
    said first axle assembly having a first axis of wheel rotation, and said second axle assembly having a second axis of wheel rotation parallel to the first axis,
    a first tie rod pivotally connected at an inner end to the frame assembly at a pivot axis equidistant from said wheel rotation axes and above the level thereof, and pivotally connected at an outer end to the first axle assembly at a pivot axis located above the first wheel rotation axis,
    a second tie rod pivotally connected at an inner end to the frame assembly at a pivot axis transversely aligned with the pivot axis at the inner end of the first tie rod, and pivotally connected at an outer end to the second axle assembly at a pivot axis located above the second wheel rotation axis,
    a first pair of depending frame legs provided by the vehicle frame assembly at opposite sides of the first differential, and a second pair of depending frame legs provided by the vehicle frame assembly at opposite sides of the second differential,
    a first pair of swing arms located on opposite sides of said first differential and a second pair of swing arms located on opposite sides of said second differential, said first and second pairs of swing arms having respective pivotal connections on the underside of the first and second axle assemblies and extending in opposite directions from one another and making pivotal connections with said first and second pairs of legs, respectively,
    a first pair of elevating hydraulic cylinder units depending from pivotal connections with the vehicle frame assembly to pivotal connections with said first pair of swing arms, and a second pair of elevating hydraulic cylinder units depending from pivotal connections with the vehicle frame assembly to pivotal connections with said second pair of swing arms,
    said first tie rod and first pair of frame arms sloping downwardly from their pivotal connections with the vehicle frame assembly when the first pair of cylinder units are fully extended, and sloping upwardly from such pivotal connections when the first pair of cylinder units are fully retracted, and said second tie rod and second pair of frame arms sloping downwardly from their pivotal connections with the vehicle frame assembly when the second pair of cylinder units are fully extended, and sloping upwardly from such pivotal connections when the second pair of cylinder units are fully retracted, to thereby minimize angulation of said universal joint connections and telescopic movement of said central drive shaft, a first pair of idler bogie units swivel-mounted for steering beneath the vehicle frame assembly at opposite sides, and a second pair of idler bogie units also swivel-mounted for steering beneath the vehicle frame assembly at opposite sides, said first and second pairs of idler bogie units having steering axes located at opposite ends of the vehicle frame assembly from one another, each of said bogie units having a pair of wheels and an elevating hydraulic cylinder unit, steering means for selectively turning said first and second pairs of idler bogie units in opposite directions to steer the vehicle, and hydraulic means carried by the vehicle frame for operating all of said elevating hydraulic cylinder units for evenly raising and lowering the entire vehicle frame assembly.

2. An elevating transport vehicle according to claim 1 in which said frame assembly includes side-by-side first and second frame brackets to which said first and second tie rods are pivotally connected at their said inner ends, respectively.

3. An elevating transport vehicle according to claim 2 in which said first and second frame brackets are located on opposite sides of the vehicle from said central drive shaft.

4. An elevating transport vehicle according to claim 1 in which said first and second tie rods are located on opposite sides of the vehicle from said central drive shaft.

5. An elevating transport vehicle according to claim 1 in which a third pair of idler bogie units are swivel-mounted for steering beneath the vehicle frame assembly at opposite sides, and a fourth pair of idler bogie units are also swivel-mounted for steering beneath the vehicle frame assembly at opposite sides, said third and fourth pairs of idler bogie units having steering axes located at opposite ends of the vehicle frame assembly from one another, each of said bogie units in said third and fourth pairs also having a pair of wheels and an elevating hydraulic cylinder unit, said steering means being adapted to also selectively turn said third and fourth pairs of idler bogie units in opposite directions from one another when said first and second pairs of idler bogie units are turned in opposite directions to steer the vehicle, and said hydraulic means being adapted to also operate the hydraulic units of said third and fourth pairs of idler bogie units for evenly raising and lowering the entire vehicle frame assembly.

* * * * *